Feb. 2, 1937.  J. W. WHITE  2,069,344
BRAKE MECHANISM
Filed Dec. 19, 1932  2 Sheets-Sheet 1
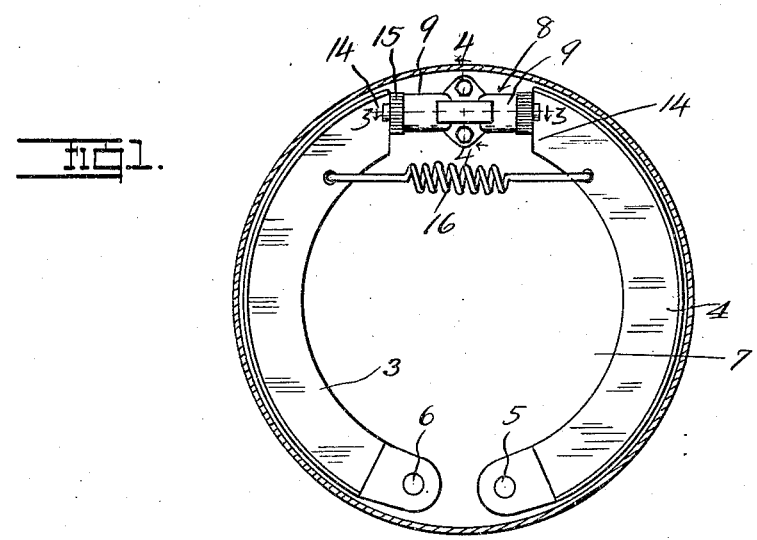
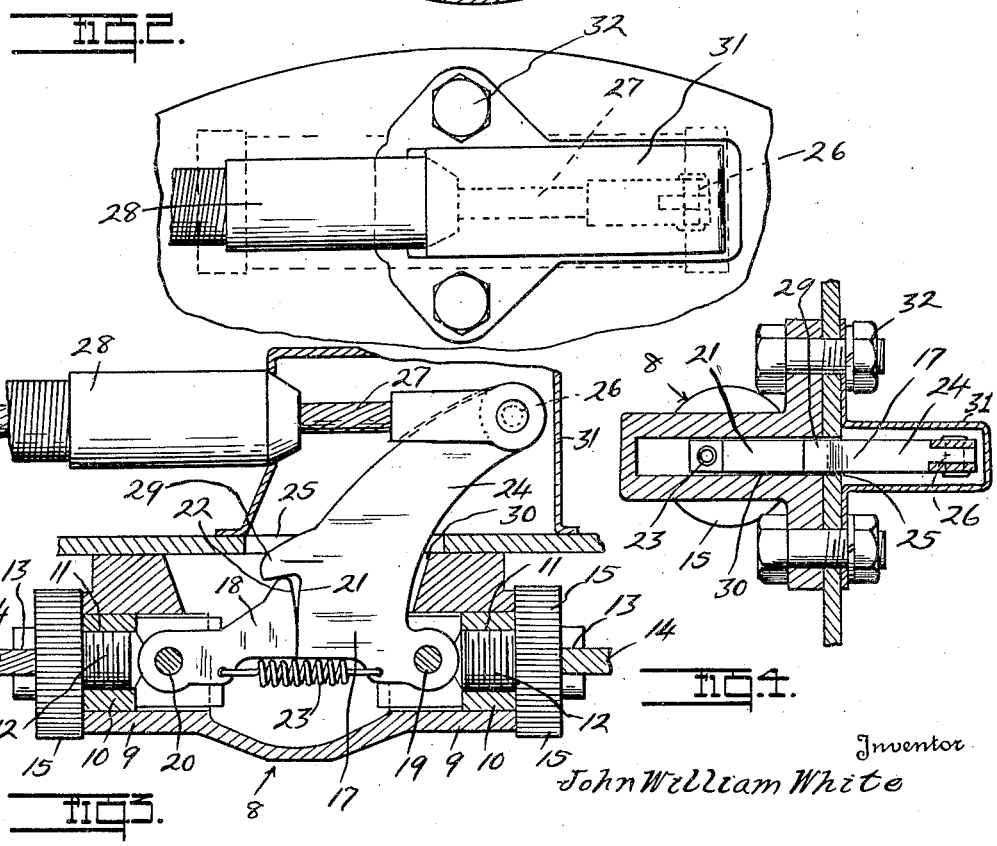
Inventor
John William White

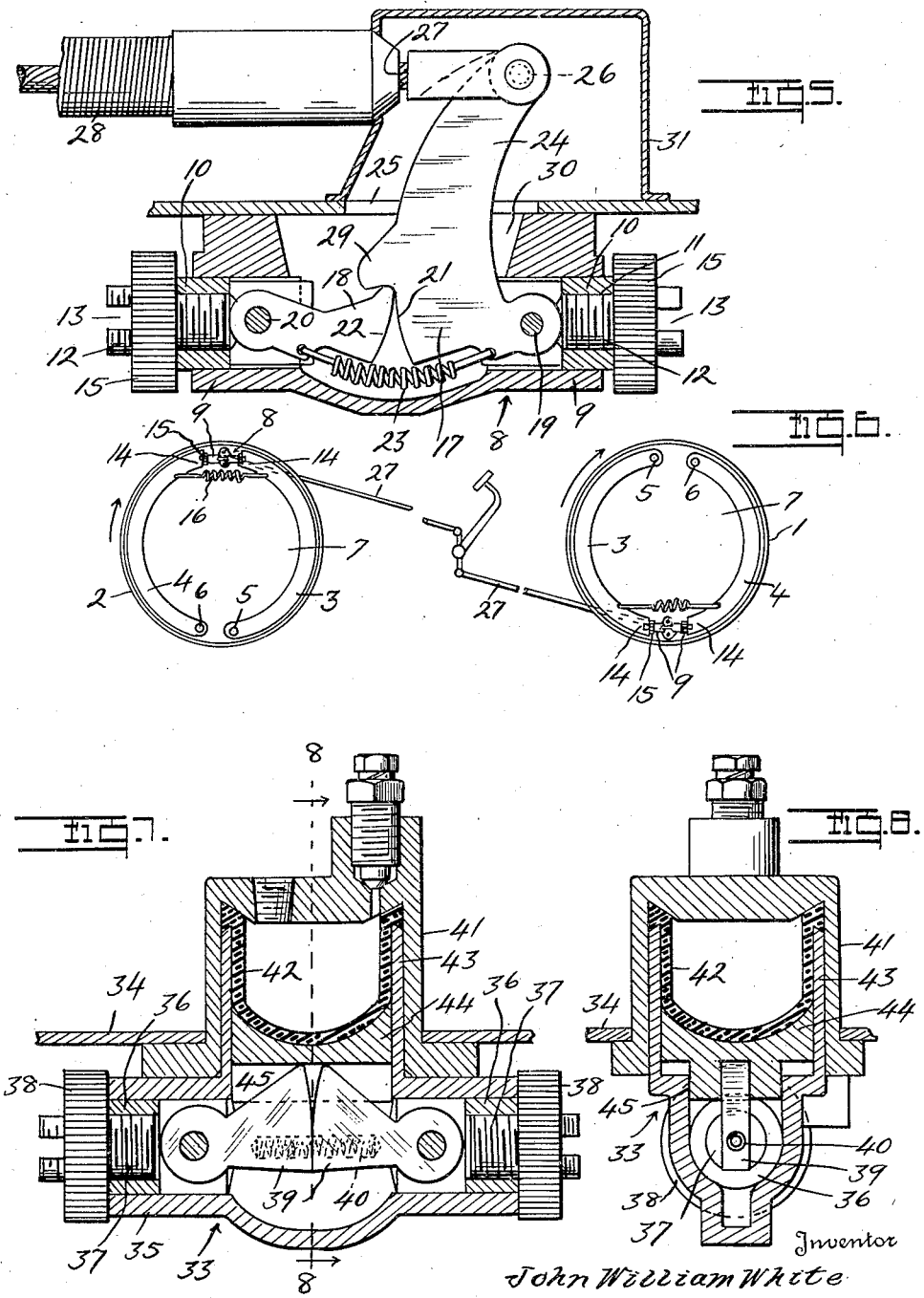

Patented Feb. 2, 1937

2,069,344

UNITED STATES PATENT OFFICE 2,069,344

BRAKE MECHANISM

John William White, Detroit, Mich., assignor, by mesne assignments, to Bendix Products Corporation, a corporation of Indiana Application December 19, 1932, Serial No. 648,017

13 Claims. (Cl. 188—78)

The invention relates to brake mechanisms and has for one of its objects to provide an improved arrangement of brake mechanism for increasing the braking action. Other objects are to provide an improved construction of actuator for the brake friction means; to so construct the actuator that it has but few parts which may be readily made and assembled and that it is compact and of relatively light weight; and to so construct the actuator that it is very efficient in operation.

With these and other objects in view, the invention resides in the novel features of construction and combinations and arrangements of parts as more fully hereinafter set forth.

In the drawings:

Figure 1 is a sectional elevation of a brake mechanism showing an embodiment of my invention;

Figure 2 is an outside elevation thereof;

Figures 3 and 4 are cross sections on the lines 3—3 and 4—4, respectively, of Figure 1;

Figure 5 is a view similar to Figure 3 showing the parts in extended position;

Figure 6 is a sectional elevation of a brake system showing  embodiment of my invention;

Figure 7 is a view similar to Figure 3 showing another embodiment of my invention;

Figure 8 is a cross section on the line 8—8 of Figure 7.

My brake mechanism is designed particularly for use with motor vehicles and, as shown particularly in Figure 6, comprises brake friction means within and engageable with each of the front wheel brake drums 1 and the rear wheel brake drums 2, and means associated with the brake friction means for actuating the same. Since the brake friction means and its actuating means is the same for each brake drum, but one will be described.

Referring to Figures 1 to 5 inclusive, while the brake friction means may be made in various ways, it is shown as comprising the shoes 3 and 4 which are pivotally mounted at adjacent ends upon the pivots 5 and 6, respectively, these pivots being secured to the brake carrier 7 which is in the nature of a backing plate closing the brake drum. 8 is the support for the actuator mounted upon the brake carrier inside the brake drum and substantially diametrically opposite the pivots 5 and 6 and adjacent the zone between the free ends of the shoes 3 and 4. This support has at its opposite ends the cylindrical portions 9 which are slidably engaged by the cylindrical plungers 10. Each plunger has extending into its outer end the axial recess 11 which is freely engaged by the screw 12 having in its outer end the slot 13 for receiving the adjacent bracket 14 upon the shoe. 15 is a nut threaded upon each screw and adapted to abut the adjacent end of the cylindrical portion of the support. 16 is a coil spring extending between the shoes 3 and 4 and normally holding the brackets 14 of these shoes in the slots 13 of the screws and the nuts 15 against the ends of the cylindrical portions 9. 17 and 18 are rockable cams pivoted respectively at 19 and 20 to the inner ends of the plungers 10 and having the cam faces 21 and 22 in rolling engagement. 23 is a coil spring having its ends connected to these cams at points on the side of the line connecting the axes of the pins 19 and 20 beyond the brake carrier, the arrangement being such that the coil spring tends to hold the cams in their retracted positions. 24 is a curved arm upon and preferably integral with the cam 17 and extending through the opening 25 in the brake carrier and transversely of this brake carrier, the free end of this arm being provided with the hole 26 for connection to the connection 27 which extends outside the brake carrier and in the direction of the free end of the shoe 4. This connection 27 is preferably a cable with a flexible sheathing 28.

For compelling the cams to rock in unison, the arm 24 is provided with the tooth 29 which extends over and is engageable with the cam 18, so that as the cam 17 is rocked toward its extended position the cam 18 is also compelled to rock toward its extended position.

The cams 17 and 18 are preferably flat and may be stamped from sheet metal and to hold the plungers 10 from rotating in the cylindrical portions 9, the portion of the actuator support 8 between the cylindrical portions 9 is provided with the groove 30 for receiving the cams and guiding the same.

31 is a housing preferably formed of sheet metal. This housing extends over the free end of the arm 24 and is clamped against the outside of the brake carrier around its opening by means of the bolts and nuts 32 which are used in securing the actuator support 8 to the brake carrier. The housing is apertured to receive one end of the sheathing 28.

With this construction, it will be seen that the parts are normally held in their retracted positions, as shown in Figures 1 and 3, and that either or both of the nuts may be adjusted to vary the clearance between the shoes and the brake drum. Upon movement of the arm 24 toward the brake shoe 4 the cams will be rocked in unison to their extended positions, thereby spreading apart the free ends of the shoes 3 and 4, the parts at this time occupying a position such as shown in Figure 5. Inasmuch as during the actuation of the brake friction means the cams and the parts between the cams and the brake shoes float or may freely move dependent only upon the resistance offered by the brake shoes, the cams apply equal spreading apart pressure to the brake shoes. Also with this construction, the actuator comprises but few parts which may be cheaply made and assembled. Also the actuator operates with very little friction loss and therefore has a very high efficiency. Furthermore, the operator is compact and of light weight. It will also be seen that the force applied to the free end of the shoe 4 is greater than that applied to the free end of the shoe 3 by the amount of the pulling force exerted upon the arm 24.

In all cases where the brake friction means is anchored between its ends and approximately opposite its actuating means, the portion of the brake friction means which may be called the leading portion and which swings in the direction of rotation of the brake drum does considerably more work than the portion of the brake friction means which may be called the trailing portion and which swings in a direction opposite to that of the direction of rotation of the brake drum. To increase the braking action, I have arranged the mechanism as shown in Figure 6, so that the above described actuators for the rear wheel brakes are located above the axes thereof and the above described actuators for the front wheel brakes are located below the axes thereof, whereby when the brakes are applied and pulling force is exerted by the connections 27 extra pressure is applied to the leading shoes 3.

Figures 7 and 8 show another embodiment of my invention in which 33 is the actuator support mounted upon the brake carrier 34, which is in the nature of a backing plate. The support has at its ends the cylindrical portions 35 in which the plungers 36 slide, these plungers being arranged to freely receive the screws 37 having slots at their outer ends for engaging the brackets upon the free ends of the brake friction means. These screws may be adjusted by the nuts 38 threaded upon the screws and normally abutting the ends of the cylindrical portions 35. The inner ends of the plungers are pivotally connected to the cams 39 which are alike and which have cam faces in rolling engagement with each other. These rockable cams are normally held in their retracted positions by the spring 40. 41 is a cylinder housing mounted upon and extending through the brake carrier 34 and having its major portion outside this brake carrier. 42 is a flexible diaphragm clamped against the end of the cylinder housing 41 by the cylindrical extension 43 upon the actuator support and extending into the cylindrical housing 41. 44 is a plunger slidable within the extension 43 and engageable with the diaphragm 42 and abutting the cams 39 and adapted to force the same to their extended positions. This plunger is provided with the slot 45 which receives the corner portions of the cams 39 and guides the same and thereby holds the plungers 36 from rotating in the cylindrical portions 35. The arrangement is such that the diaphragm is located outside the brake carrier, so that the braking fluid is materially protected from the heat generated inside the brake drum and, furthermore, is more readily cooled by reason of the cylinder housing being in the air stream when the motor vehicle is in motion.

What I claim as my invention is:

1. In brake mechanism, the combination with a brake carrier and brake friction means mounted thereon and having relatively movable ends, of a support mounted on said carrier, members upon said support for moving said ends, rockable cams movable in unison and operatively connected to said members and having cooperating cam faces in engagement, a cylinder extending transversely of and mounted upon said brake carrier, and a plunger extending within said cylinder and abutting said cams and having a slot for receiving and guiding portions of said cams.

2. In brake mechanism, the combination with a brake carrier and brake friction means mounted thereon and having relatively movable ends, of a support mounted on said carrier, members upon said support for moving said ends, rockable cams movable in unison and operatively connected to said members and having cooperating cam faces in engagement, a housing extending transversely of and mounted upon said brake carrier, a tubular extension upon said support and extending within said housing, a diaphragm clamped between said housing and tubular extension, and a plunger between said diaphragm and cams for actuating the latter from the former.

3. In brake mechanism, the combination with a brake carrier and brake friction means mounted thereon and having relatively movable ends, of a support mounted on said carrier and having cylindrical portions, plungers slidable in said cylindrical portions for moving said ends, rockable cams operatively connected to said plungers and having cooperating cam faces in engagement, and a plunger movable transversely of said carrier and support for actuating said cams, said plunger having a slot for receiving and guiding portions of said cams.

4. In brake mechanism, the combination with a brake carrier and brake friction means mounted thereon and having relatively movable ends, of a support mounted on said carrier and having cylindrical portions, plungers slidable in said cylindrical portions for moving said ends, and rockable cams movable in unison and operatively connected to said plungers and having cooperating cam faces in engagement, said support having a slot for receiving and guiding portions of said cams.

5. In brake mechanism, the combination with a brake carrier and brake friction means mounted thereon and having relatively movable ends, of a support mounted on said carrier, members upon said support for moving said ends, rockable cams movable in unison and operatively connected to said members and having cooperating cam faces in engagement, and an arm extending from one of said cams and transversely through said carrier for actuating said cams.

6. In brake mechanism, the combination with a brake carrier and brake friction means mounted thereon and having relatively movable ends, of a support mounted on said carrier, members upon said support for spreading apart said ends, rockable cams between and pivoted upon said members and having cooperating cam faces in rolling engagement, means for compelling said cams to rock in unison, and an arm extending from one of said cams and through said carrier for actuating said cam.

7. In brake mechanism, the combination with a brake carrier and brake friction means mounted thereon and having relatively movable ends, of a support mounted on said carrier, members upon said support for moving said ends, rockable cams movable in unison and operatively connected to said members and having cooperating cam faces in engagement, an arm extending from one of said cams and transversely through said carrier for actuating said cams, and a housing upon said carrier for said arm.

8. In brake mechanism, the combination with brake friction means having relatively movable ends and anchored intermediate said ends, said means comprising leading and trailing portions, of rockable cams between said ends mounted to move bodily in opposite directions and having cooperating cam faces in engagement for spreading apart said ends, and means for exerting a force in the direction of said leading portion to actuate said cams.

9. In brake mechanism, the combination with a brake carrier and brake friction means mounted thereon and having leading and trailing portions, of a support on said carrier, rockable cams mounted upon said support for movement bodily with the friction means and having cooperating cam faces in engagement for spreading apart the ends of said leading and trailing portions, and an arm operatively connected to one of said cams and movable in the direction of said leading portion to actuate said cams.

10. In brake mechanism, the combination with brake friction means having relatively movable ends and anchored intermediate said ends, said means comprising leading and trailing portions, of rockable cams between said ends mounted to move bodily with the friction means and having cooperating cam faces in engagement for spreading apart said ends, and means for exerting a force in the direction of one of said portions to actuate said cams.

11. In a brake mechanism, the combination with a brake carrier and brake friction means mounted thereon and having relatively movable ends, of a support mounted on said carrier, members upon said support for spreading apart said ends, rockable cams between said members and respectively pivotally connected to the latter and having cooperating cam faces in rolling engagement, an arm extending from one of the cams through the carrier, and means for applying a force to said arm in the direction of the end of the friction means with which the other cam is associated, said means including a member connected to the end of the arm at a point in rear of a plane perpendicular to the line of action of said force applying means and passing through the axis of the pivotal connection between the first named cam and associated member.

12. In brake mechanism, the combination with a brake carrier and brake friction means mounted thereon and having relatively movable ends, of a support mounted on the carrier, members slidably mounted upon the support and respectively operatively connected to the leading and trailing portions of the friction means, means interposed between said members for actuating the same to spread the aforesaid ends of the friction means apart, said means comprising a cam pivotally connected to the member associated with the leading portion of the friction means and provided with a cam face having a rolling engagement with a cooperating cam pivotally connected to the other of said members, an arm extending from said second cam through the carrier, and means for applying a force to said arm in the direction of the leading portion of the band including a member connected to the end of the arm at a point in rear of a plane perpendicular to the line of action of said force applying means and passing through the axis of the pivotal connection between said second cam and its associated member.

13. In brake mechanism, the combination with brake friction means having relatively movable ends, of means for spreading the ends including rockable cams disposed between said ends and having cooperating cam faces in rolling engagement, means for exerting a force in the direction of one end portion of the friction means to actuate said cams including an arm extending from the cam adjacent the opposite end portion of the friction means, and a member connected to said arm at a point in rear of a plane perpendicular to the line of action of said force exerting means and passing substantially through the axis of the rocking movement of the cam with which said arm is associated.

JOHN WILLIAM WHITE.